US 8,998,168 B2

(12) United States Patent
Witkowski et al.

(10) Patent No.: US 8,998,168 B2
(45) Date of Patent: *Apr. 7, 2015

(54) PLUG VALVE INDICATOR

(71) Applicant: S.P.M. Flow Control, Inc., Fort Worth, TX (US)

(72) Inventors: Brian C. Witkowski, Weatherford, TX (US); Edward C. Kotapish, Willow Park, TX (US)

(73) Assignee: S.P.M. Flow Control, Inc., Fort Worth, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 13/918,479

(22) Filed: Jun. 14, 2013

(65) Prior Publication Data

US 2013/0299727 A1    Nov. 14, 2013

Related U.S. Application Data

(63) Continuation of application No. 12/793,194, filed on Jun. 3, 2010, now Pat. No. 8,465,001.

(60) Provisional application No. 61/183,617, filed on Jun. 3, 2009.

(51) Int. Cl.
*F16K 35/00* (2006.01)
*F16K 37/00* (2006.01)
*F16K 5/04* (2006.01)

(52) U.S. Cl.
CPC .......... *F16K 37/0008* (2013.01); *F16K 5/0442* (2013.01); *F16K 37/0016* (2013.01)

(58) Field of Classification Search
CPC . F16K 5/0647; F16K 31/535; F16K 37/0008; F16K 37/0016
USPC .......... 251/249.5, 292, 286, 288, 89, 93, 101; 137/556, 556.3; 116/277; 74/325
See application file for complete search history.

(56) References Cited

U.S. PATENT DOCUMENTS

| 345,420 A | 7/1886 | Eskholme et al. |
| 375,464 A | 12/1887 | Thacher et al. |

(Continued)

FOREIGN PATENT DOCUMENTS

| AU | 1320088 A | 9/1988 |
| AU | 649744 B2 | 6/1994 |

(Continued)

OTHER PUBLICATIONS

BJ 285959—3 Inch 15,000 PSi Popoff Valve, Mar. 26, 2004 (1 page).

(Continued)

*Primary Examiner* — Marina Tietjen
(74) *Attorney, Agent, or Firm* — Gardere Wynne Sewell LLP

(57) ABSTRACT

A valve has a body having a rotatable valve element. A drive mechanism has a drive input member and a drive output member that are coupled to the valve element for rotating the valve element. A shear member is operatively located within the drive mechanism between the drive input member and the drive output member for shearing in the event the force to rotate the valve element is excessive. The valve has indicia indicating open and closed positions for the valve element. An indicator is mounted to output drive member to properly align with the indicia regardless whether the shear member has sheared or not.

12 Claims, 4 Drawing Sheets

(56) References Cited

U.S. PATENT DOCUMENTS

| | | | |
|---|---|---|---|
| 580,226 | A | 4/1897 | Sanford |
| 741,477 | A | 10/1903 | Flinn |
| 1,201,022 | A | 10/1916 | Conniff |
| 1,379,092 | A | 5/1921 | Fraccascia |
| 1,452,603 | A | 4/1923 | Himes |
| 1,473,634 | A | 11/1923 | Loudon |
| 1,483,001 | A | 2/1924 | Kurre |
| 1,488,211 | A | 3/1924 | Loeffler |
| 1,543,637 | A | 6/1925 | Woll |
| 1,607,463 | A | 11/1926 | Kent |
| 1,664,493 | A | 4/1928 | Smith |
| 1,675,808 | A | 7/1928 | Kliss |
| 1,764,936 | A | 6/1930 | Dean |
| 1,798,498 | A | 3/1931 | Riley |
| D86,952 | S | 5/1932 | Garrison et al. |
| 1,889,256 | A | 11/1932 | Lipscomb |
| 1,990,090 | A | 2/1935 | Packard |
| 2,197,320 | A | 4/1940 | Shenton |
| 2,310,583 | A | 2/1943 | Johnson |
| 2,310,813 | A | 2/1943 | Sellmeyer |
| 2,339,287 | A | 1/1944 | Neef, Jr. |
| 2,354,161 | A | 7/1944 | Waterman |
| 2,361,881 | A | 10/1944 | Sheppard |
| 2,391,266 | A | 12/1945 | Parker |
| 2,404,142 | A | 7/1946 | Parker |
| D150,466 | S | 8/1948 | Schuler |
| 2,506,162 | A | 5/1950 | Metzgar |
| 2,576,431 | A | 11/1951 | White |
| 2,587,212 | A | 2/1952 | Placette |
| 2,589,144 | A | 3/1952 | Russell et al. |
| 2,606,068 | A | 8/1952 | Bonacor |
| 2,612,340 | A | 9/1952 | Laurent |
| 2,663,458 | A | 12/1953 | Macglashan |
| 2,694,503 | A | 11/1954 | Young |
| 2,717,001 | A | 9/1955 | Perrault |
| 2,746,773 | A | 5/1956 | Bily |
| 2,766,999 | A | 10/1956 | Watts |
| 2,795,459 | A | 6/1957 | Cornelius |
| 2,923,317 | A | 2/1960 | McInerney |
| 2,925,827 | A | 2/1960 | Anderson et al. |
| 2,969,492 | A | 1/1961 | Wheatley et al. |
| 3,024,047 | A | 3/1962 | Schmohl |
| 3,060,961 | A | 10/1962 | Conley |
| 3,061,267 | A | 10/1962 | Hamer et al. |
| 3,064,940 | A | 11/1962 | Anderson |
| 3,072,379 | A | 1/1963 | Hamer |
| 3,108,939 | A | 10/1963 | Sabins et al. |
| 3,113,792 | A | 12/1963 | Brown |
| 3,150,681 | A | 9/1964 | Hansen |
| 3,160,426 | A | 12/1964 | Faeser |
| 3,204,484 | A | 9/1965 | Gustafson et al. |
| 3,216,746 | A | 11/1965 | Watts |
| 3,228,334 | A | 1/1966 | Oss |
| 3,238,687 | A | 3/1966 | Tisbo |
| 3,241,567 | A | 3/1966 | Pusch |
| 3,294,425 | A | 12/1966 | Franck |
| 3,341,232 | A | 9/1967 | Deakins |
| 3,343,802 | A | 9/1967 | Schuilwerve |
| 3,346,002 | A | 10/1967 | Thompson, Jr. et al. |
| 3,357,679 | A | 12/1967 | Gulick |
| 3,403,931 | A | 10/1968 | Crain |
| 3,404,698 | A | 10/1968 | Dorch |
| 3,425,661 | A | 2/1969 | Mayo |
| 3,439,897 | A | 4/1969 | Priese |
| 3,455,534 | A | 7/1969 | Scaramucci |
| 3,467,224 | A | 9/1969 | Curtis |
| 3,472,479 | A | 10/1969 | Sherwood |
| 3,554,581 | A | 1/1971 | Mason |
| 3,556,474 | A | 1/1971 | Domer Scaramucci |
| 3,561,727 | A | 2/1971 | Scaramucci |
| 3,571,896 | A | 3/1971 | Wilkerson |
| 3,594,835 | A | 7/1971 | Wilson |
| 3,630,483 | A | 12/1971 | Canalizo |
| 3,680,188 | A | 8/1972 | Mason et al. |
| 3,687,415 | A | 8/1972 | Turkot |
| 3,712,585 | A | 1/1973 | Grenier |
| 3,726,314 | A | 4/1973 | Moen |
| 3,789,872 | A | 2/1974 | Elliott |
| 3,813,733 | A | 6/1974 | Flohr |
| 3,840,048 | A | 10/1974 | Moen |
| 3,845,876 | A | 11/1974 | Needham et al. |
| 3,845,879 | A | 11/1974 | Dernbach et al. |
| 3,881,480 | A | 5/1975 | LaFourcade |
| 3,894,718 | A | 7/1975 | Koch et al. |
| 3,901,259 | A | 8/1975 | Banbury |
| 3,916,950 | A | 11/1975 | Mongerson et al. |
| 3,933,172 | A | 1/1976 | Allen |
| 3,934,608 | A | 1/1976 | Guyton |
| 3,937,240 | A | 2/1976 | Nanny |
| 3,942,551 | A | 3/1976 | Schuller et al. |
| 3,967,842 | A | 7/1976 | Kendrick |
| 3,972,364 | A | 8/1976 | Brumm |
| 3,974,848 | A | 8/1976 | Wheatley |
| 4,022,427 | A | 5/1977 | Read |
| 4,027,696 | A | 6/1977 | Guyton |
| 4,046,164 | A | 9/1977 | Pool |
| 4,059,872 | A | 11/1977 | Delesandri |
| 4,085,770 | A | 4/1978 | Woronowicz |
| 4,086,803 | A | 5/1978 | Wheeler |
| 4,093,180 | A | 6/1978 | Strabala |
| 4,113,228 | A | 9/1978 | Frye |
| 4,146,047 | A | 3/1979 | Wood et al. |
| 4,150,847 | A | 4/1979 | De Cenzo |
| 4,171,095 | A | 10/1979 | Filan et al. |
| 4,218,080 | A | 8/1980 | Kendrick |
| 4,221,204 | A | 9/1980 | Meyer |
| 4,254,793 | A | 3/1981 | Scaramucci |
| 4,261,387 | A | 4/1981 | Cohn |
| 4,274,434 | A | 6/1981 | Hafele |
| 4,286,621 | A | 9/1981 | Glahn |
| 4,321,945 | A | 3/1982 | Chabat-Courrede |
| 4,327,768 | A | 5/1982 | Behle |
| 4,332,370 | A | 6/1982 | Williams |
| 4,338,707 | A | 7/1982 | Byerly |
| 4,367,571 | A | 1/1983 | Speirs et al. |
| 4,378,849 | A | 4/1983 | Wilks |
| 4,399,830 | A | 8/1983 | Brodie |
| 4,445,255 | A | 5/1984 | Olejak |
| 4,448,148 | A | 5/1984 | Gain |
| 4,478,388 | A | 10/1984 | George |
| 4,485,530 | A | 12/1984 | Begley et al. |
| 4,485,843 | A | 12/1984 | Wolff |
| 4,497,344 | A | 2/1985 | Kisiel |
| 4,501,291 | A | 2/1985 | Siegrist |
| 4,506,696 | A | 3/1985 | Von Pechmann |
| 4,511,120 | A | 4/1985 | Conley et al. |
| 4,524,599 | A | 6/1985 | Bailey |
| 4,531,542 | A | 7/1985 | Looney |
| 4,590,957 | A | 5/1986 | McFarlane |
| 4,597,505 | A | 7/1986 | Mozley et al. |
| 4,605,036 | A | 8/1986 | Smith et al. |
| 4,616,803 | A | 10/1986 | Schils |
| 4,667,570 | A | 5/1987 | Jensen, Jr. et al. |
| 4,705,306 | A | 11/1987 | Guido et al. |
| 4,716,930 | A | 1/1988 | Richmond et al. |
| 4,732,215 | A | 3/1988 | Hopper |
| 4,836,240 | A | 6/1989 | Elliott |
| 4,842,014 | A | 6/1989 | Strelow et al. |
| 4,848,398 | A | 7/1989 | Leach |
| 4,864,696 | A | 9/1989 | Mittermaier et al. |
| 4,896,367 | A | 1/1990 | Newton et al. |
| 4,915,418 | A | 4/1990 | Palatchy |
| 4,969,482 | A | 11/1990 | Perrin et al. |
| 4,993,489 | A | 2/1991 | McLeod |
| 5,025,865 | A | 6/1991 | Caldwell et al. |
| 5,046,525 | A | 9/1991 | Powell |
| 5,056,548 | A | 10/1991 | Mills |
| 5,143,112 | A | 9/1992 | Scaramucci |
| 5,161,566 | A | 11/1992 | Scaramucci |
| 5,161,570 | A | 11/1992 | Scaramucci |
| 5,165,478 | A | 11/1992 | Wilson |
| 5,178,185 | A | 1/1993 | Stehling et al. |
| 5,199,464 | A | 4/1993 | Savard |
| 5,307,835 | A | 5/1994 | Scaramucci |

(56) References Cited

U.S. PATENT DOCUMENTS

| | | |
|---|---|---|
| 5,341,840 A | 8/1994 | Manson et al. |
| 5,386,847 A | 2/1995 | Scaramucci |
| 5,417,402 A | 5/1995 | Speybroeck |
| D360,728 S | 7/1995 | Nozaki |
| 5,439,027 A | 8/1995 | Layton et al. |
| 5,441,072 A | 8/1995 | Indey et al. |
| 5,443,088 A | 8/1995 | Hoch et al. |
| 5,462,413 A | 10/1995 | Schroeder |
| 5,477,752 A | 12/1995 | West et al. |
| 5,507,533 A | 4/1996 | Mumma |
| 5,522,420 A | 6/1996 | Martin |
| 5,526,883 A | 6/1996 | Breaux |
| 5,538,296 A | 7/1996 | Horton |
| 5,544,675 A | 8/1996 | Dean |
| 5,584,315 A | 12/1996 | Powell |
| 5,603,485 A | 2/1997 | Schwarz |
| 5,676,348 A | 10/1997 | Ungchusri et al. |
| 5,685,334 A | 11/1997 | Hagan |
| 5,689,862 A | 11/1997 | Hayes et al. |
| 5,755,427 A | 5/1998 | Koskinas |
| 5,787,926 A | 8/1998 | Mukumoto et al. |
| 5,791,693 A | 8/1998 | Crawford |
| 5,832,947 A | 11/1998 | Niemczyk |
| 5,947,152 A | 9/1999 | Martin et al. |
| 5,957,592 A | 9/1999 | Yamanaka |
| 5,971,007 A | 10/1999 | Harcourt et al. |
| 5,983,826 A | 11/1999 | Lohde |
| 6,003,837 A | 12/1999 | Raymond, Jr. |
| 6,029,693 A | 2/2000 | Nakanishi et al. |
| 6,079,439 A | 6/2000 | Hartley |
| 6,082,707 A | 7/2000 | Hosie et al. |
| 6,085,572 A | 7/2000 | McGuire, Sr. et al. |
| 6,089,531 A | 7/2000 | Young |
| 6,155,091 A | 12/2000 | Hayes et al. |
| 6,164,707 A | 12/2000 | Ungchusri et al. |
| 6,209,561 B1 | 4/2001 | Kugelev et al. |
| 6,230,733 B1 | 5/2001 | Strelow et al. |
| 6,240,951 B1 | 6/2001 | Yori |
| 6,250,605 B1 | 6/2001 | Young |
| 6,290,237 B1 | 9/2001 | Graupner |
| 6,361,051 B1 | 3/2002 | Babin |
| 6,371,527 B1 | 4/2002 | Ungchusri et al. |
| 6,382,247 B1 | 5/2002 | Gundry |
| 6,387,226 B1 | 5/2002 | Persson |
| 6,450,477 B1 | 9/2002 | Young |
| 6,554,024 B2 | 4/2003 | Mefford et al. |
| 6,554,249 B2 | 4/2003 | Pang et al. |
| 6,742,538 B1 | 6/2004 | Aderholt et al. |
| 6,752,377 B1 | 6/2004 | Taylor et al. |
| 6,770,177 B2 | 8/2004 | Keller et al. |
| 6,843,265 B2 | 1/2005 | Taylor |
| 6,854,704 B1 | 2/2005 | Young |
| 6,880,567 B2 | 4/2005 | Klaver et al. |
| 6,880,568 B1 | 4/2005 | Taylor |
| 6,886,593 B2 | 5/2005 | Madden et al. |
| 6,945,569 B1 | 9/2005 | Diaz et al. |
| 6,948,526 B2 | 9/2005 | Seder et al. |
| 6,978,799 B2 | 12/2005 | Kugelev et al. |
| 7,004,445 B2 | 2/2006 | Lymberopoulos |
| 7,028,778 B2 | 4/2006 | Krywitsky |
| 7,028,986 B2 | 4/2006 | Young |
| 7,204,525 B2 | 4/2007 | Matzner |
| RE39,695 E | 6/2007 | Ungchusri et al. |
| 7,228,869 B2 | 6/2007 | Wilhelm |
| D549,850 S | 8/2007 | Perlman |
| 7,264,059 B2 | 9/2007 | Akselberg |
| 7,285,190 B2 | 10/2007 | Martin, Jr. |
| 7,302,961 B2 | 12/2007 | Martin et al. |
| D570,501 S | 6/2008 | Janesz et al. |
| 7,398,796 B2 | 7/2008 | Hjorth et al. |
| 7,401,819 B2 | 7/2008 | Gibb et al. |
| 7,451,959 B2 | 11/2008 | Matzner |
| 7,458,212 B2 | 12/2008 | Koizumi et al. |
| 7,516,941 B2 | 4/2009 | Combs |
| 7,549,681 B1 | 6/2009 | Matzner |
| 7,677,526 B2 | 3/2010 | Lymberopoulos |
| 7,819,386 B2 | 10/2010 | Combs |
| 7,823,265 B2 | 11/2010 | Matzner et al. |
| 7,890,276 B2 | 2/2011 | Killion et al. |
| 7,950,409 B2 | 5/2011 | Stokes et al. |
| 8,000,909 B2 | 8/2011 | Danzy |
| 8,051,875 B2 | 11/2011 | Edwards |
| D660,461 S | 5/2012 | Kotin |
| D660,984 S | 5/2012 | Kotin et al. |
| 8,196,229 B1 | 6/2012 | Hickok |
| D666,326 S | 8/2012 | Sims |
| 8,261,771 B2 | 9/2012 | Witkowski et al. |
| D675,750 S | 2/2013 | King |
| 8,376,046 B2 | 2/2013 | Broussard, II |
| 8,465,001 B2 | 6/2013 | Witkowski et al. |
| 8,469,108 B2 | 6/2013 | Kajaria et al. |
| 8,474,521 B2 | 7/2013 | Kajaria et al. |
| 8,490,949 B2 | 7/2013 | Lanning et al. |
| D703,294 S | 4/2014 | Witkowski et al. |
| D707,332 S | 6/2014 | Witkowski et al. |
| D707,797 S | 6/2014 | Wilkowski et al. |
| 2002/0179876 A1 | 12/2002 | Pang et al. |
| 2002/0185867 A1 | 12/2002 | Stachowiak |
| 2002/0186910 A1 | 12/2002 | Maret |
| 2003/0047944 A1 | 3/2003 | Ungchusri et al. |
| 2003/0178067 A1 | 9/2003 | Fredrickson et al. |
| 2004/0163716 A1 | 8/2004 | Madden et al. |
| 2005/0121073 A1 | 6/2005 | Carroll |
| 2005/0199286 A1 | 9/2005 | Appleford et al. |
| 2006/0091339 A1 | 5/2006 | Young |
| 2006/0185731 A1 | 8/2006 | Grable et al. |
| 2006/0266422 A1 | 11/2006 | Feenstra et al. |
| 2006/0283513 A1 | 12/2006 | Kurian et al. |
| 2007/0029090 A1 | 2/2007 | Andreychuk et al. |
| 2007/0051411 A1 | 3/2007 | Scaramucci et al. |
| 2007/0205387 A1 | 9/2007 | Grau et al. |
| 2007/0262029 A1 | 11/2007 | Yoshida et al. |
| 2007/0272308 A1 | 11/2007 | Spears et al. |
| 2008/0039802 A1 | 2/2008 | Vangsness et al. |
| 2008/0054204 A1 | 3/2008 | Zhou |
| 2008/0142752 A1 | 6/2008 | Matzner |
| 2008/0196773 A1 | 8/2008 | Franconi |
| 2008/0264649 A1 | 10/2008 | Crawford |
| 2008/0295910 A1 | 12/2008 | Aleksandersen et al. |
| 2008/0308159 A1 | 12/2008 | Stunkard |
| 2009/0008934 A1 | 1/2009 | Matzner et al. |
| 2010/0154894 A1 | 6/2010 | Kotapish et al. |
| 2010/0258200 A1 | 10/2010 | Walker et al. |
| 2010/0326541 A1 | 12/2010 | Kugelev et al. |
| 2011/0036415 A1 | 2/2011 | Lymberopoulos |
| 2011/0061871 A1 | 3/2011 | Omvik |
| 2011/0240126 A1 | 10/2011 | Lymberopoulos et al. |
| 2011/0316274 A1 | 12/2011 | Gronlund et al. |
| 2012/0025114 A1 | 2/2012 | Lymberopoulos et al. |
| 2012/0031494 A1 | 2/2012 | Lymberopoulos |
| 2012/0073670 A1 | 3/2012 | Lymberopoulos |
| 2012/0085541 A1 | 4/2012 | Love et al. |
| 2012/0091743 A1 | 4/2012 | Ohman, III et al. |
| 2012/0181015 A1 | 7/2012 | Kajaria et al. |
| 2012/0181016 A1 | 7/2012 | Kajaria et al. |
| 2012/0219354 A1 | 8/2012 | Bauer et al. |
| 2012/0227983 A1 | 9/2012 | Lymberopoulos et al. |
| 2012/0255734 A1 | 10/2012 | Coli et al. |
| 2012/0298213 A1 | 11/2012 | Forster et al. |
| 2012/0325332 A1 | 12/2012 | Ball et al. |
| 2013/0000745 A1 | 1/2013 | Witkowski et al. |
| 2013/0020170 A1 | 1/2013 | Lymberopoulos |
| 2013/0037125 A1 | 2/2013 | Drake et al. |
| 2013/0248182 A1 | 9/2013 | Chong et al. |
| 2014/0048158 A1 | 2/2014 | Baca et al. |
| 2014/0048255 A1 | 2/2014 | Baca et al. |
| 2014/0048734 A1 | 2/2014 | Witkowski et al. |

FOREIGN PATENT DOCUMENTS

| | | |
|---|---|---|
| AU | 348253 | 5/2013 |
| CA | 2485817 A1 | 4/2005 |
| CA | 2490664 A1 | 10/2005 |
| CA | 2503231 A1 | 10/2005 |

(56) References Cited

FOREIGN PATENT DOCUMENTS

| | | |
|---|---|---|
| CA | 2612397 A1 | 6/2008 |
| CA | 2636751 A1 | 1/2009 |
| CN | 2118877 U | 10/1992 |
| CN | 1137309 A | 12/1996 |
| CN | 1225298 A | 8/1999 |
| CN | 2426550 Y | 4/2001 |
| CN | 1548701 A | 11/2004 |
| CN | 2901281 Y | 5/2007 |
| CN | 200999609 Y | 1/2008 |
| CN | 201043685 Y | 4/2008 |
| CN | 101205798 A | 6/2008 |
| CN | 101258350 A | 9/2008 |
| CN | 101303033 A | 11/2008 |
| CN | 101367099 A | 2/2009 |
| CN | 201206648 Y | 3/2009 |
| CN | 201262043 Y | 6/2009 |
| CN | 101539218 A | 9/2009 |
| CN | 101722221 A | 6/2010 |
| CN | 201496006 U | 6/2010 |
| CN | 201545914 U | 8/2010 |
| CN | 201650157 U | 11/2010 |
| CN | 201739525 U | 2/2011 |
| CN | 201747313 U | 2/2011 |
| CN | 202047762 U | 11/2011 |
| CN | 102323158 A | 1/2012 |
| CN | 202144943 U | 2/2012 |
| CN | 202208237 U | 5/2012 |
| CN | 202255397 U | 5/2012 |
| CN | 202255848 U | 5/2012 |
| CN | 202718658 U | 2/2013 |
| CN | ZL2013300399164 | 9/2013 |
| CN | ZL201330441389 | 4/2014 |
| CN | ZL201080025350.3 | 5/2014 |
| CN | ZL201330441241.6 | 5/2014 |
| DE | 1166571 B | 3/1964 |
| DE | 2415732 A1 | 10/1974 |
| DE | 2358756 A1 | 3/1975 |
| DE | 2558272 A1 | 7/1977 |
| DE | 2642743 A1 | 3/1978 |
| DE | 218416 A1 | 2/1985 |
| DE | 3341643 A1 | 5/1985 |
| DE | 19707228 A1 | 8/1998 |
| DE | 102004033453 A1 | 1/2006 |
| EA | 201171356 A1 | 5/2012 |
| EM | 002185371-0001 | 2/2013 |
| EM | 002307421-0001 | 9/2013 |
| EM | 002307421-0002 | 9/2013 |
| EP | 44619 A1 | 1/1982 |
| EP | 0559131 A1 | 9/1993 |
| EP | 1219942 A1 | 7/2002 |
| EP | 1488867 A1 | 12/2004 |
| FR | 2635476 A1 | 2/1990 |
| GB | 255970 A | 8/1926 |
| GB | 578008 A | 6/1946 |
| GB | 619950 A | 3/1949 |
| GB | 731895 A | 6/1955 |
| GB | 1536728 A | 12/1978 |
| GB | 2056626 A | 3/1981 |
| GB | 2117822 A | 10/1983 |
| GB | 2140338 A | 11/1984 |
| GB | 2185287 A | 7/1987 |
| GB | 2228885 A | 9/1990 |
| GB | 2312728 B | 5/2000 |
| GB | 2355510 A | 4/2001 |
| GB | 2408562 A | 6/2005 |
| GB | 2416574 B | 8/2008 |
| GB | 2413606 B | 3/2009 |
| GB | 2444822 B | 6/2011 |
| GB | 2452801 B | 4/2012 |
| GB | 2493900 A | 2/2013 |
| IN | 251691 | 8/2012 |
| JP | 53108873 A | 9/1978 |
| JP | 53125261 A | 11/1978 |
| JP | 57073187 | 5/1982 |
| JP | 57079400 | 5/1982 |
| JP | 61093344 | 5/1986 |
| JP | 08075022 | 3/1996 |
| JP | 08128536 | 5/1996 |
| JP | 08291543 A | 11/1996 |
| JP | 08300052 | 11/1996 |
| JP | 10175026 | 6/1998 |
| JP | 2000330646 | 11/2000 |
| JP | 2001355774 A | 12/2001 |
| JP | 2002098068 | 4/2002 |
| JP | 2004190769 A | 7/2004 |
| JP | 2006194334 A | 7/2006 |
| JP | D1285004 | 9/2006 |
| JP | 2008215626 A | 9/2008 |
| JP | 4996990 B2 | 8/2012 |
| JP | 05033883 | 9/2012 |
| KR | 100540389 B1 | 12/2005 |
| KR | 100540390 B1 | 12/2005 |
| KR | 100540392 B1 | 12/2005 |
| KR | 100621158 B1 | 8/2006 |
| KR | 100716760 B1 | 5/2007 |
| KR | 100832065 B1 | 5/2008 |
| KR | 101191630 B1 | 10/2012 |
| MX | 2011011007 A | 2/2012 |
| MX | 2011012944 A | 6/2012 |
| MX | 40533 | 12/2013 |
| RU | 1466084 C | 6/1995 |
| RU | 1417281 C | 7/1995 |
| RU | 02088831 C1 | 8/1997 |
| RU | 2242313 C2 | 12/2004 |
| RU | 2367770 C1 | 9/2009 |
| RU | 2367771 C1 | 9/2009 |
| SG | 175263 A1 | 11/2011 |
| SG | 176534 A1 | 1/2012 |
| SG | D2013186 G | 4/2013 |
| SU | 567001 A1 | 7/1977 |
| SU | 585898 A1 | 12/1977 |
| SU | 1391769 A1 | 4/1988 |
| SU | 1721368 A1 | 3/1992 |
| WO | WO-9713398 A2 | 4/1997 |
| WO | WO-2009023042 A1 | 2/2009 |
| WO | WO-2010080636 A2 | 7/2010 |
| WO | WO-2010123889 A2 | 10/2010 |
| WO | WO-2010141651 A2 | 12/2010 |
| WO | WO-2010151680 A2 | 12/2010 |
| WO | WO-2011095453 A1 | 8/2011 |
| WO | WO-2013023154 A1 | 2/2013 |
| WO | WO-2014028498 A2 | 2/2014 |
| WO | WO-2014028795 A2 | 2/2014 |

OTHER PUBLICATIONS

CN OA 2010800253503 mailed Jun. 5, 2013 (8 pages).
EP Search Report mailed Jan. 30, 2013 for EP09838004.1 (4 pages).
Grayloc(r) Products, 3" flange diameter, Jul. 24, 2006 (2 pages).
Harrisburg, Inc., "Reset Relief Valves" brochure, (c) 1982) (2 pages).
HP70-001 OA for U.S. Appl. No. 06/419,141 mailed Nov. 17, 1983 (4 pages).
HP70-006 OA for U.S. Appl. No. 08/643,239 mailed Dec. 30, 1996 (11 pages).
HP70-011 NOA for U.S. Appl. No. 10/690,888 mailed Aug. 29, 2005 (7 pages).
HP70-016 NOA for U.S. Appl. No. 10/833,859 mailed Jul. 6, 2005 (4 pages).
HP70-016 OA for U.S. Appl. No. 10/833,859 mailed Dec. 22, 2004 (5 pages).
HP70-021 NOA for U.S. Appl. No. 11/013,486 mailed Feb. 12, 2007 (4 pages).
HP70-021 NOA for U.S. Appl. No. 11/414,984 mailed Feb. 11, 2009 (8 pages).
HP70-021 OA for U.S. Appl. No. 11/013,486 mailed Aug. 30, 2005 (12 pages).
HP70-022 NOA for U.S. Appl. No. 11/354,663 mailed Jun. 29, 2010 (4 pages).
HP70-022 OA for U.S. Appl. No. 11/354,663 mailed Jan. 8, 2010 (6 pages).
HP70-023 CA 2612397 NOA mailed Dec. 20, 2012 (1 page).

(56) References Cited

OTHER PUBLICATIONS

HP70-023 NOA for U.S. Appl. No. 11/638,965 mailed Sep. 23, 2008 (6 pages).
HP70-023 OA for U.S. Appl. No. 11/638,965 mailed Apr. 4, 2008 (10 pages).
HP70-024 Advisory Action mailed May 20, 2013 for U.S. Appl. No. 12/165,680 (3 pages).
HP70-024 Final Office Action dated Jan. 31, 2012 for U.S. Appl. No. 12/165,680 (28 pages).
HP70-024 Final Office Action dated Mar. 7, 2013 for U.S. Appl. No. 12/165,680 (23 pages).
HP70-024 Office Action mailed Aug. 9, 2011 for U.S. Appl. No. 12/165,680 (18 pages).
HP70-024 Office Action mailed Jul. 12, 2013 for U.S. Appl. No. 12/165,680 (24 pages).
HP70-024 Office Action mailed May 31, 2011 for GB 0812086.7 (2 pages).
HP70-029 ISR and WO for PCT/US2009/068822 mailed Aug. 9, 2010 (7 pages).
HP70-029 OA for U.S. Appl. No. 12/642,541 mailed Mar. 19, 2012 (15 pages).
HP70-036 EP Extended SR for EP10767632.2 mailed Mar. 14, 2013 (6 pages).
HP70-036 EP SR for EP10767632.2 mailed Mar. 14, 2013 (6 pages).
HP70-036 ISR and WO for PCT/US2010/031738 mailed Dec. 27, 2010 (7 pages).
HP70-036 NOA for U.S. Appl. No. 12/763,786 mailed May 16, 2012 (6 pages).
HP70-036 OA for U.S. Appl. No. 12/763,786 mailed Oct. 11, 2011 (9 pages).
HP70-036 OA for U.S. Appl. No. 13/608,562 mailed Sep. 13, 2013 (12 pages).
HP70-037 ISR and WO for PCTUS2010/037156 mailed Jan. 13, 2011 (8 pages).
HP70-037 NOA for U.S. Appl. No. 12/793,194 mailed Feb. 19, 2013 (10 pages).
HP70-037 OA for U.S. Appl. No. 12/793,194 mailed Oct. 25, 2012 (8 pages).
HP70-039 FOA for U.S. Appl. No. 12/822,900 mailed Aug. 16, 2013 (15 pages).
HP70-039 ISR and WO for PCT/US2010/039834 Feb. 8, 2011 (6 pages).
HP70-039 OA for U.S. Appl. No. 12/822,900 mailed Dec. 6, 2012 (20 pages).
HP70-072 IPRP for PCT/US2012/050376 mailed Jul. 15, 2013 (28 pages).
HP70-072 ISR and WO for PCT/US2012/050376 mailed Oct. 26, 2012 (2 pages).
HP70-714 IN Exam Report for IN Design 251691 mailed Jun. 26, 2013 (2 pages).
S.P.M. Flow Control, Inc. (Weir SPM), "Long Radius Swivel Joints," 2007 (5 pages).
S.P.M. Flow Control, Inc., "Flow Control Products and Drilling Equipment for the Worldwide Petroleum Industry," [online] Jan. 8, 2007, <URL:www.spmflo.com>.
S.P.M. Flow Control, Inc., "High-Pressure Long Radius Swivel Joints," 2002, www.spmflo.com (1 page).
S.P.M. Flow Control, Inc., "Long Radius Swivel Joints, H2S, Operating and Maintenance Instructions," 1999 (6 pages).
S.P.M. Flow Control, Inc., "Long Radius Swivel Joints, Operating and Maintenance Instructions," 2004 (4 pages).
S.P.M. Flow Control, Inc., "Long Radius Swivel Joints, Operating and Maintenance Instructions," 2006 (6 pages).
S.P.M. Flow Control, Inc., "Swivel Joints," 1999 (1 page).
SPM "Emergency Relief Valve Brochure" 1997 (4 pages).
Supplemental European Search Report mailed Jul. 11, 2013 in corresponding European Application No. EP 10784052.
"Canadian Examiner's Report issued Feb. 10, 2014, by CIPO, re App No. 152957".
"Eurasian Office Action issued Nov. 19, 2013, by The Eurasian Patent Office, re App No. 201171356".
"International Search Report and Written Opinion by the ISA/US, mailed Feb. 7, 2014, re PCT/US2013/054741".
"Notice of Allowance mailed Feb. 7, 2014, by the USPTO, re U.S. Appl. No. 29/449,852".
"Notice of Allowance mailed Feb. 7, 2014, by the USPTO, re U.S. Appl. No. 29/449,867".
"Notice of Allowance mailed Jan. 16, 2014, by the USPTO, re U.S. Appl. No. 29/453,837".
"Notice of Allowance mailed Nov. 22, 2013, by the USPTO, re U.S. Appl. No. 12/822,900".
"Notice of Allowance mailed Nov. 26, 2013, by the USPTO, re U.S. Appl. No. 29/429,809".
"Russian Office Action, issued by the Russian Patent Office, re App No. 2013500548".
Brazil Office Action, dated Jun. 3, 2014, re App No. BR3020130006611.
Canadian Examination Report dated Apr. 28, 2014, by the CIPO, re App No. 2764310.
Canadian Examination Report dated Feb. 7, 2014, by the CIPO, re App No. 149748.
Canadian Examination Report dated Feb. 10, 2014, by the CIPO, re App No. 152956.
Second Written Opinion, by the IPEA/US, mailed Jul. 28, 2014, re PCT/US2013/054741.
European Exam Report, by the EPO, dated Apr. 8, 2014, re App No. 10784052.2.
Final Office Action mailed Apr. 25, 2014, re U.S. Appl. No. 13/608,562.
Final Office Action mailed Feb. 28, 2014, re U.S. Appl. No. 12/165,680.
Notice of Allowance mailed Jun. 25, 2014, re U.S. Appl. No. 12/165,680.
Office Action mailed Jun. 18, 2014, re U.S. Appl. No. 13/572,293.

PLUG VALVE INDICATOR

CROSS-REFERENCE TO RELATED APPLICATION

This application is a continuation of Ser. No. 12/793,194, filed Jun. 3, 2010, now U.S. Pat. No. 8,465,001, which claims priority to provisional application Ser. No. 61/183,617, filed Jun. 3, 2009.

FIELD OF THE INVENTION

This invention relates in general to plug valves for flowlines and in particular to an indicator that indicates the position of the plug.

BACKGROUND OF THE INVENTION

In hydraulic fracturing of wells, large pumps are connected to a wellhead by temporary flow lines to pump high volumes of fluid into the well. The pressure is selected to be high enough to cause cracks or fracturing of the earth formation. Valves are employed in the flow lines to control the flow.

One type of valve has a body with a flow passage extending through it that intersects a central cavity. A rotatable valve element, such as a cylindrical plug, is mounted in the cavity. The valve element has a passage that aligns with the passage in the body when open. A drive mechanism is used to rotate the valve element between open and closed positions.

The drive mechanism may have a drive sleeve that is rotated by a hand wheel attached to a worm gear. A drive shaft fits within the bore of the sleeve and has an inner end coupled to the valve element. A shear key inserts between mating grooves between the drive shaft and the drive sleeve. Rotating the hand wheel thus causes the drive shaft to rotate the valve element. The drive mechanism may have a face with indicia to indicate the open or closed position of the valve element. An indicator is mounted to the drive sleeve to align with the indicia.

High fluid pressure within the valve can require considerable force to rotate the hand wheel. If the force is too high, the shear key will shear, allowing the drive sleeve to rotate even though the valve element is not rotating. The indicator may indicate an erroneous position of the valve element because the indicator continues to rotate with the drive sleeve after the shear key shears.

SUMMARY

The valve of this invention has a body having a body passage therethrough intersected by a central cavity. A valve element having a valve passage therethrough is rotatably carried in the cavity for movement between an open position and a closed position. A drive mechanism having a drive input member and a drive output member is coupled to the valve element for rotating the valve element. A shear member is operatively located within the drive mechanism between the drive input member and the drive output member. The shear member shears in the event the force to rotate the valve element is excessive.

Indicia are located on the valve indicating open and closed positions for the valve element. An indicator is cooperatively mounted to valve element so that it is fixed for rotation with the valve element. The indicator points to the correct indicia regardless whether the shear member has sheared or not.

Preferably the indicator is fixed to the drive output member. The indicator may comprise a plate with a pointer, the plate being mounted to an outer end of the drive output member. The drive mechanism includes a housing having a face containing an aperture in one embodiment. The indicia are located on the face of the housing. Preferably, the output drive member comprises a drive shaft having an inner end in driving engagement with the valve element and an outer end extending through the aperture in the housing. The indicator is fixed to the outer end of the drive shaft.

The indicator may comprise a plate secured to the outer end of the drive shaft, the plate having a pointer thereon. The plate may have a circular periphery with an outer diameter greater than the outer end of the drive shaft. In the preferred embodiment, the indicator is positioned farther from the valve element than the face of the housing.

DETAILED DESCRIPTION OF THE INVENTION

Figure 2:
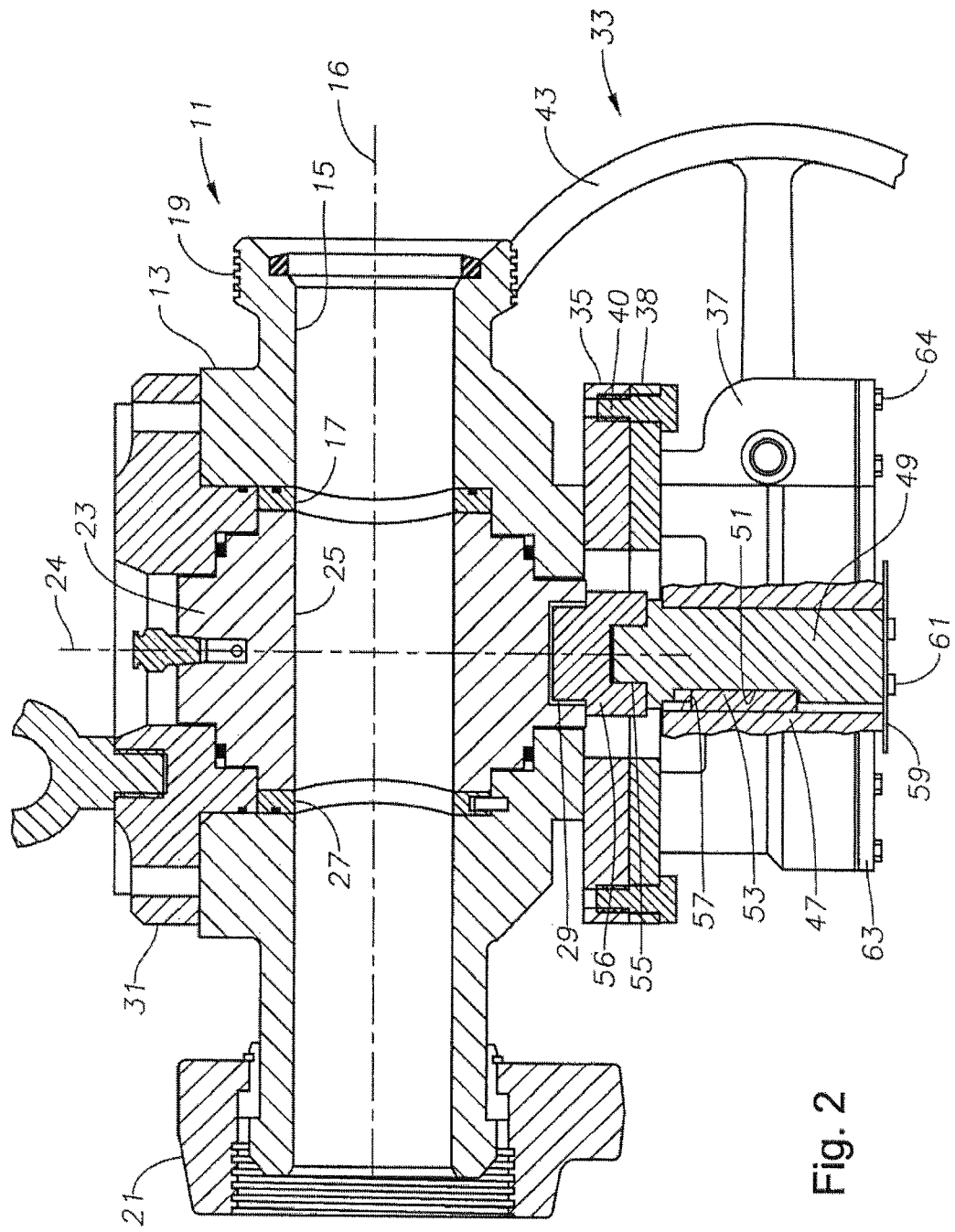
FIG. 2 is a partial sectional view of the plug valve of FIG. 1.

Referring to FIG. 2, in this example, valve 11 is shown as a plug valve. Valve 11 has a body 13 with a flow passage 15 extending through it along an axis 16. A cavity 17 is located in the central portion of flow passage 15. In this example, cavity 17 is cylindrical. Flow passage 15 has opposite ends for securing into a flow line. The ends may be configured in any suitable manner, and in this embodiment, external threads 19 are located on one end and a rotatable coupling sleeve 21 on the other.

A rotatable, cylindrical plug or valve element 23 is located within cylindrical cavity 17. Valve element 23 is a cylindrical member that is rotatable about an axis 24 that is perpendicular to axis 16 of flow passage 15. Valve element 23 has a passage 25 that extends from one side to the other. When in the open position, passage 25 is coaxial with flow passage 15. When in the closed position, passage 25 is perpendicular to flow passage 15, blocking flow through passage 15. Valve element 23 sealingly engages seat rings 27 that are located at each junction of cavity 17 with flow passage 15. Seat rings 27 seal between flow passage 15 and valve element 23. Valve element 23 has a polygonal drive socket 29 on one end. The opposite end of valve element 23 is retained by a retainer plate 31. Retainer plate 31 is secured by fasteners to body 13.

Figure 3:
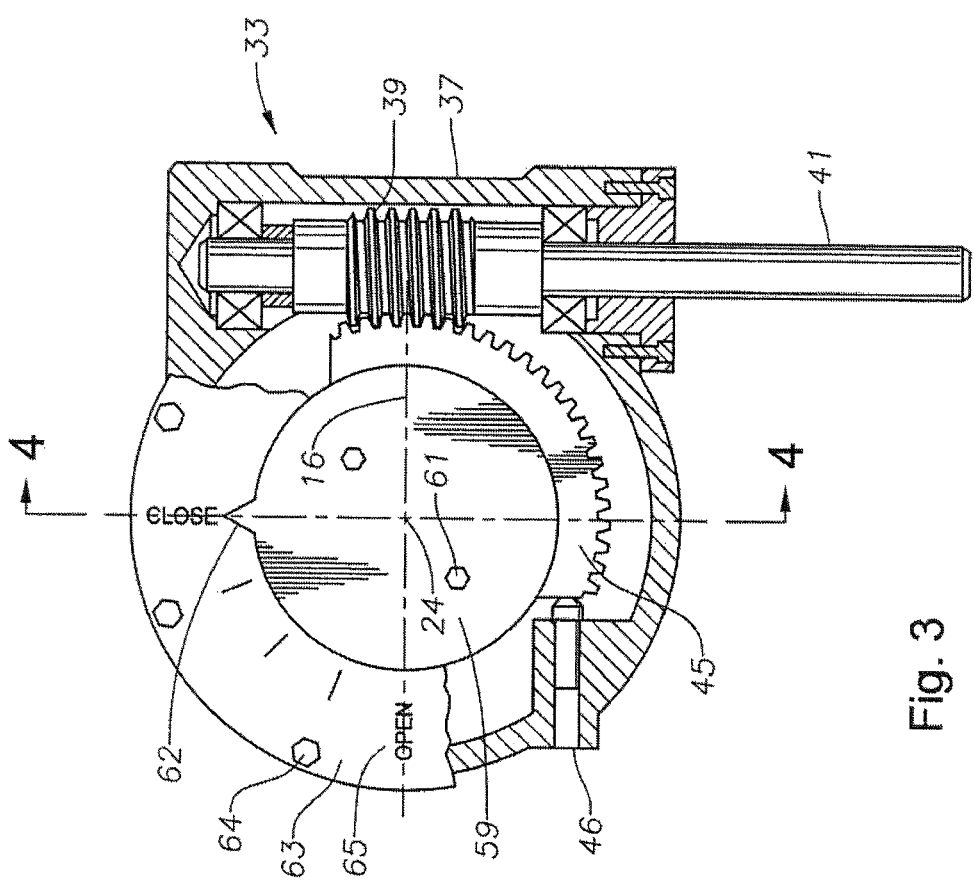
FIG. 3 is a partial sectional view of a portion of the operator for the plug valve of FIG. 1, shown removed from the plug valve.
Figure 7:
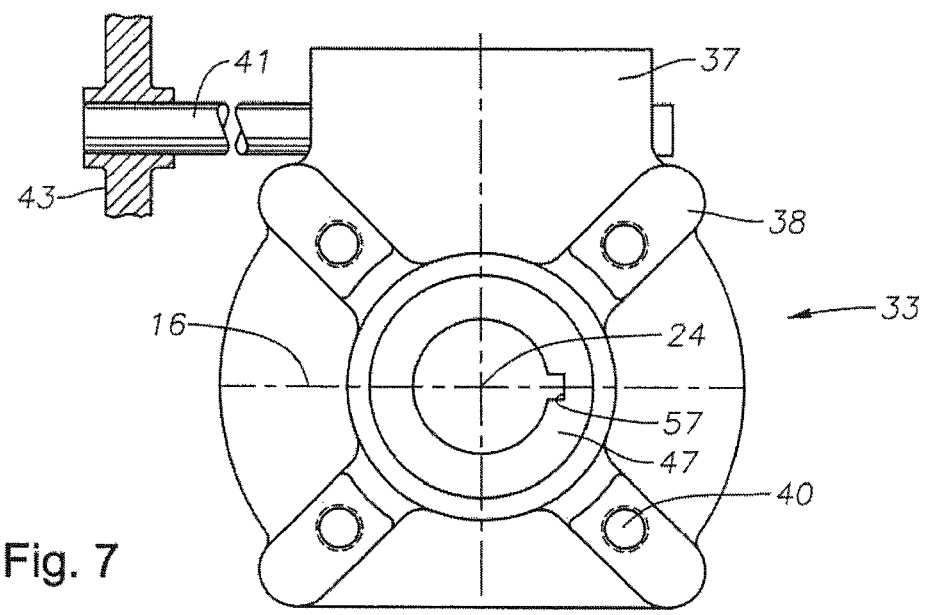
FIG. 7 is a back view of the operator of the plug valve of FIG. 1, shown detached from the plug valve.

A drive mechanism 33 is employed to rotate valve element 23 between open and closed positions. In this embodiment, drive mechanism 33 has a back side that mounts to an adapter plate 35, which in turn is secured to valve body 13 by fasteners (not shown). Drive mechanism 33 has a housing 37 with a base 38 that secures to adapter plate 35 by fasteners 40, shown also in FIG. 7. Referring to FIG. 3, drive mechanism 33 has a gear train that in this embodiment includes a worm gear 39. Worm gear 39 is formed on a shaft 41 that extends forward from housing 37. A hand wheel 43 (FIG. 2) attaches to shaft 41 for rotating worm gear 39. Worm gear 39 meshes with and rotates a gear segment 45, which in this embodiment is a fan-shaped member that extends 90°. Gear segment 45 abuts a stop 46 when rotated 90° in one direction. When rotated 90° in the other direction, it will abut another stop (not shown).

Figure 4:
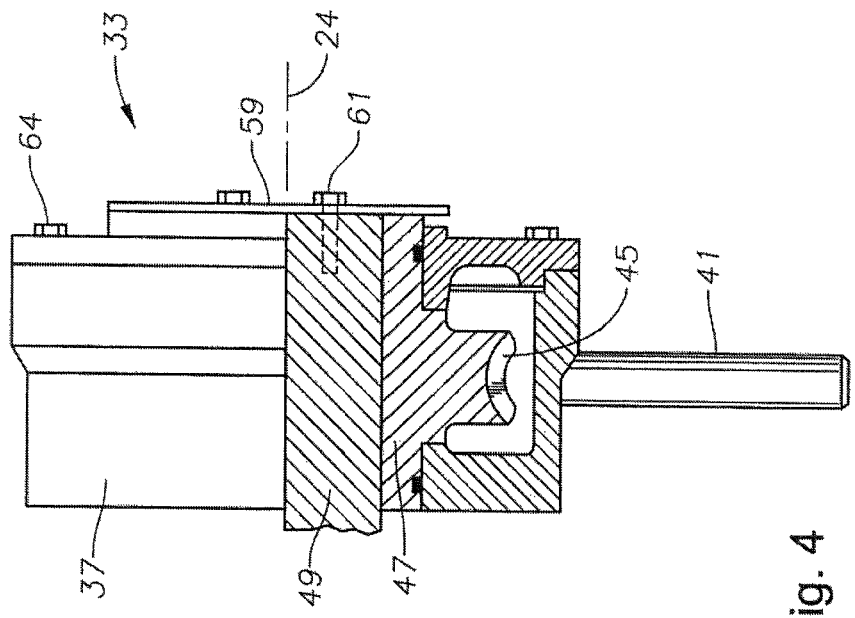
FIG. 4 is another sectional view of the operator of FIG. 3, taken along the line 4-4 of FIG. 3.

As shown in FIG. 4, gear segment 45 is integrally formed or otherwise attached to an input member, such as a gear sleeve 47. Gear sleeve 47 is carried within housing 37 for rotation about axis 24 of valve element 23. An output member, such as drive shaft 49, extends into a central cylindrical bore in gear sleeve 47. Drive shaft 49 has an axially extending groove or keyway 51, shown in FIGS. 2 and 5, that receives a shear key 53 (FIG. 2). Key 53 protrudes from keyway 51 into engagement with a keyway 57 (FIGS. 2 and 7) located in the inner diameter of gear sleeve 47. Key 53 transmits rotation of gear sleeve 47 to drive shaft 49.

Figure 5:
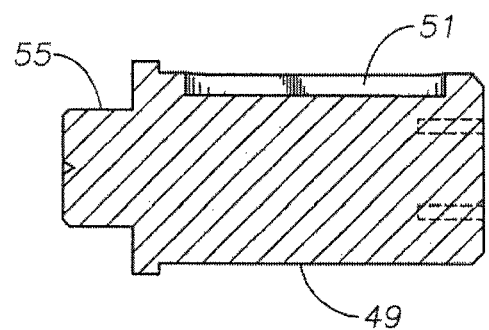
FIG. 5 is a sectional view of the drive shaft for the plug valve of FIG. 1, shown removed from the operator.
Figure 6:
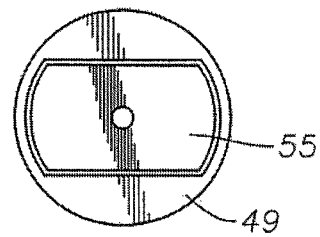
FIG. 6 is an end view of the drive shaft shown in FIG. 5.

Drive shaft 49 has a polygonal drive member 55, shown in FIGS. 5 and 6, on its inner end that engages a polygonal recess in an intermediate or extension drive member 56 (FIG. 2). Extension drive member 56 has an inner end that engages polygonal drive socket 29, as shown in FIG. 2. In this embodiment, drive member 55 has two flat sides, providing a generally rectangular configuration with rounded ends. Other shapes are suitable.

Figure 1:
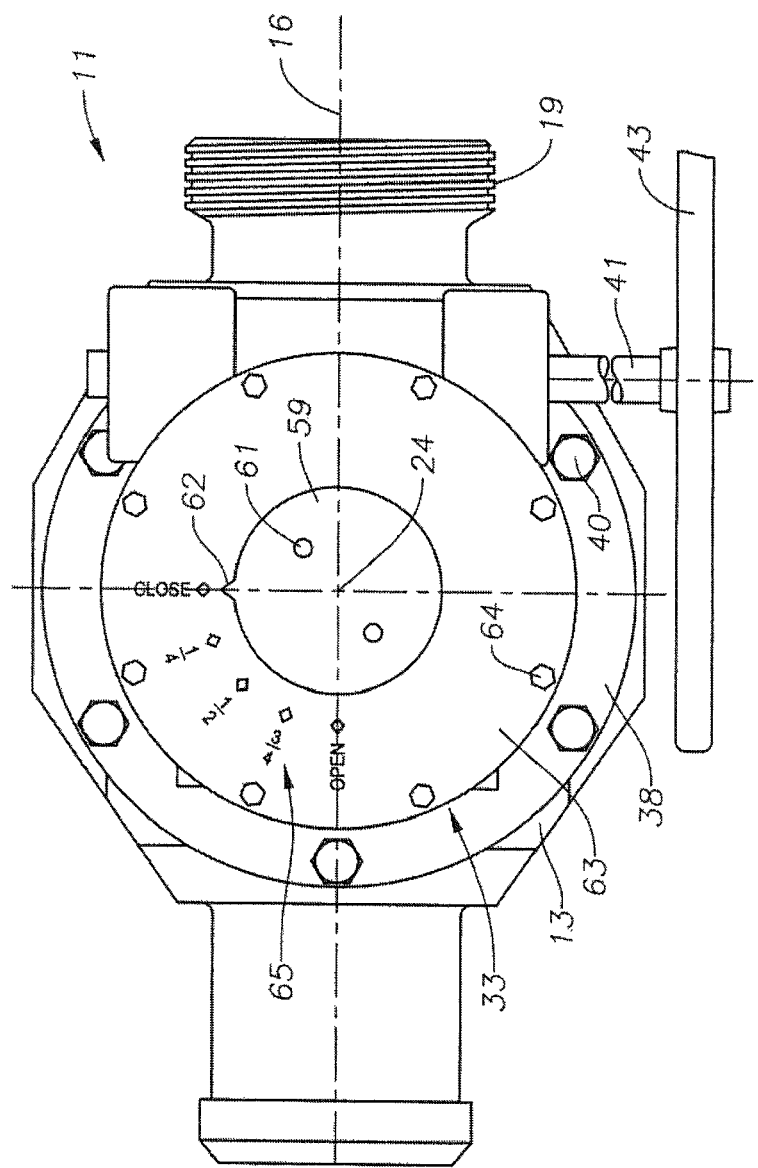
FIG. 1 is a front elevational view of a plug valve constructed in accordance with this invention.

Referring to FIG. 4, a circular, flat indicator plate 59 is secured to the front or outer end of drive shaft 49 by fasteners 61. Indicator plate 59 thus rotates in unison with drive shaft 49. Indicator plate 59 has a pointer 62, shown in FIG. 3, on its circumference. Referring still to FIGS. 3 and 4, a circular non rotatable cover plate 63 is secured by fasteners 64 to the front end of operator housing 37. Cover plate 63 is flat and forms a face for housing 37. Cover plate 63 has a central aperture through which the outer end of drive shaft 49 extends a short distance. Cover plate 63 has a greater outer diameter than indicator plate 59, which is located on a front side of cover plate 63. The outer diameter of indicator plate 59 is greater than the central aperture within cover plate 63. As shown in FIGS. 1 and 3, indicia 65 are placed on the front side of cover plate 63 in a 90 degree array relative to plug axis 24. Pointer 62 points to indicia 65 to inform the operator the particular rotational position of drive shaft 49, and thus the rotational position of valve passage 25 (FIG. 2) relative to flow passage 15.

During operation, when valve 11 is in the closed position, pointer 62 will point toward the portion of indicia 65 indicating that the valve is closed, as shown in FIGS. 1 and 3. When the operator rotates hand wheel 43, worm gear 39 will rotate gear segment 45, causing drive shaft 49 to move from the closed position toward the open position. Indicator plate 59 will rotate in unison with drive shaft 49. If the pressure in flow passage 15 is very high, a significant force may be required to rotate valve element 23 from the open to the closed position. If the force is excessive, key 53 will shear to avoid excessive damage to drive mechanism 33. If key 53 shears, the operator may continue to rotate hand wheel 43, which will continue to cause gear sleeve 47 to rotate. However, drive shaft 49 will not rotate with gear sleeve 47. Indicator plate 59 will not rotate either because it is affixed to drive shaft 49 for rotation therewith. Consequently, the operator will know the exact rotational position of valve element 23 even if key 53 has sheared.

While the invention has been shown in only one of its forms, it should be apparent to those skilled in the art that it is not so limited but is susceptible to various changes without departing from the scope of the invention.

The invention claimed is:

1. A valve, comprising:
   a body having a body passage therethrough intersected by a central cavity, the body having a flat side portion with an access opening therethrough;
   a valve element having a valve passage therethrough and rotatably carried in the cavity for movement between an open position with the valve passage and the body passage aligned and a closed position, the valve element having an end within the access opening, the end having a drive socket formed therein;
   an adapter plate secured to the side portion of the body, the adapter plate having a central opening in alignment with the access opening;
   a drive mechanism housing having an inner side wall that abuts and is fastened to an outer side of the adapter plate, the inner side wall of the housing having an inner side opening in alignment with the central opening and the access opening, the housing having an outer side with an outer side opening;
   a drive sleeve rotatably mounted in the housing and having an outer end protruding through the outer side opening of the housing;
   a drive mechanism operably coupled to the drive sleeve for rotating the drive sleeve;
   a drive shaft mounted in the drive sleeve, the drive shaft having an inner end protruding from the drive sleeve into the inner side opening of the housing, the drive shaft having an outer end protruding through the outer side opening of the housing;
   an extension member having an outer end with a receptacle that receives the inner end of the drive shaft, the extension member extending through the central opening of the adapter plate and having an inner end that inserts into the drive socket of the valve element for rotating the valve element;
   a shear member between the drive sleeve and the drive shaft that causes rotation of the drive shaft in unison with the drive sleeve and shears in the event the force to rotate the valve element is excessive, resulting in the drive sleeve being rotatable relative to the drive shaft;
   indicia at the outer side of the housing indicating open and closed positions for the valve element; and
   an indicator mounted to the outer end of the drive shaft for rotation therewith, the indicator aligning with the indicia, the drive sleeve being rotatable relative to the indicator in the event the shear member has sheared.

2. The valve according to claim 1, wherein:
   the outer end of the drive shaft protrudes past the outer side of the housing at least as far as the outer end of the drive sleeve.

3. The valve according to claim 1, wherein:
   the indicator comprises a circular plate with a circumference having a pointer, the plate being mounted to the outer end of the driveshaft.

4. The valve according to claim 1, wherein:
   the drive sleeve has an inner end located within the inner side opening of the housing.

5. The valve according to claim 1, wherein the inner end of the drive shaft protrudes into the central opening of the adapter plate and is spaced outward from the access opening in the body.

6. The valve according to claim 1, wherein:
   the indicator comprises an indicator plate with a circular periphery having a pointer extending therefrom, the indicator plate being mounted to the outer end of the drive shaft; and the circular periphery of the indicator plate has an outer diameter greater than an outer diameter of the outer end of the drive shaft.

7. The valve according to claim 5, wherein the inner end of the drive shaft and the receptacle of the extension member are polygonal.

8. A valve, comprising:
a body having a body passage therethrough intersected by a cavity;
a valve element having a valve element passage and rotatably carried in the cavity for movement between an open position with the valve element and body passages aligned and a closed position;
a drive mechanism housing secured to the body, the housing having a side wall with a face having a face opening;
a drive sleeve having a bore and rotatably mounted in the housing, the drive sleeve having an outer end extending through the face opening past the face of the housing; a drive mechanism operably coupled to the drive sleeve for rotating the drive sleeve;
a drive shaft located within the bore of the drive sleeve, the drive shaft having an inner end cooperatively coupled with the valve element for rotating the valve element in response to rotation of the output shaft, the drive shaft having an outer end that protrudes through the face opening of the housing at least as far as the outer end of the drive sleeve;
a shear member located between the drive sleeve and the drive shaft, the shear member allowing rotation of the drive sleeve relative to the drive shaft if the shear members shears;
indicia at the face adjacent the face opening indicating open and closed positions for the valve element; and
an indicator secured to the outer end of the drive shaft for rotation therewith, the indicator aligning with the indicia to indicate the position of the valve element.

9. The valve according to claim 8, wherein the drive element has a drive socket, and the valve further comprises:
an extension member having an inner end that inserts into the drive socket and an outer end that has a receptacle; and
the inner end of the drive shaft inserts into the receptacle of the extension member for causing rotation of the extension member and the valve element in unison with the drive shaft.

10. In a valve having a body with a body passage therethrough intersected by a cylindrical cavity, and a cylindrical valve element having a valve element passage and rotatably carried in the cavity for movement between an open position with the valve element and body passages aligned and a closed position, the valve element having a drive socket formed therein, the improvement comprising: a drive mechanism housing secured to the body, the housing having an outer side wall with a face and an outer side opening at the face;
a drive sleeve within the housing having a bore;
a drive mechanism operably coupled with the drive sleeve for rotating the drive sleeve;
a drive shaft located within the bore of the drive sleeve, the drive shaft having an outer end;
an extension member having an inner end that inserts into the drive socket and an outer end that has a receptacle; and
the drive shaft has an inner end that inserts into the receptacle of the extension member for causing rotation of the extension member and the drive shaft in unison with the drive shaft;
a shear member located between the drive sleeve and the drive shaft, the shear member allowing rotation of the drive sleeve relative to the drive shaft if the shear members shears;
indicia at the face adjacent the outer side opening indicating open and closed positions for the valve element; and
an indicator fixed to the outer end of the drive shaft for rotation therewith, the indicator aligning with the indicia to indicate the position of the valve element.

11. The valve according to claim 10, wherein:
the drive sleeve has an outer end that extends past the face.

12. The valve according to claim 11, wherein:
the outer end of the drive shaft extends past the face at least as far as the input sleeve.

* * * * *